A. DOBLER.
Malt-Crushers.
No. 158,257. Patented Dec. 29, 1874.
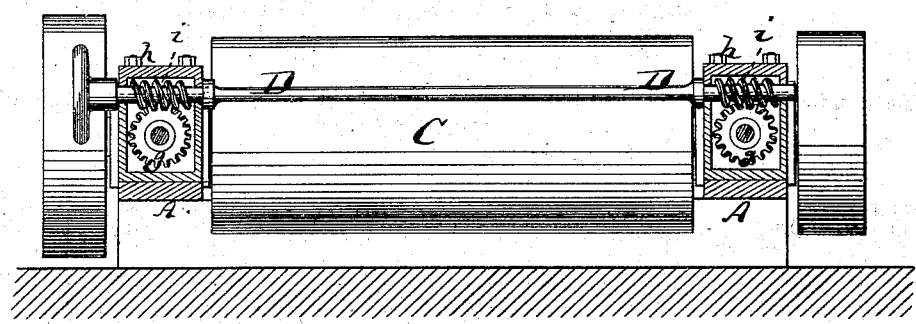
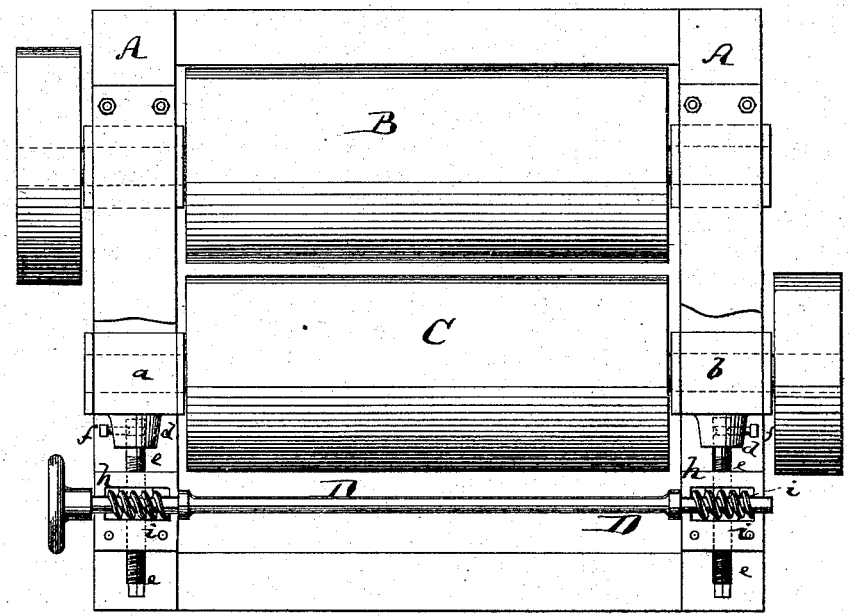
Witnesses:
A. Moraga.
E. C. Webb.
Inventor:
Anton Dobler
by his attorney
A. v. Briesen

UNITED STATES PATENT OFFICE.

ANTON DOBLER, OF BROOKLYN, NEW YORK.

IMPROVEMENT IN MALT-CRUSHERS.

Specification forming part of Letters Patent No. 158,257, dated December 29, 1874; application filed October 16, 1874.

*To all whom it may concern:*

Be it known that I, ANTON DOBLER, of Brooklyn, in the county of Kings and State of New York, have invented a new and Improved Malt-Crusher, of which the following is a specification:

Figure 1 is a side elevation, partly in section, of my improved malt-crusher. Fig. 2 is a top view of the same.

Similar letters of reference indicate corresponding parts in both figures.

This invention relates to an improvement in machines for mashing or crushing grain, especially malt, for use in breweries and other purposes; and the invention consists in combining both sliding bearings of the adjustable crushing-roller with projecting screws, internally-threaded worm-wheels, which are confined in boxes, and with a screw-shaft, so that both ends of said roller may always be moved simultaneously and in equal degree, although either end may be adjusted separately, as hereinafter more fully described.

In crushing-machines, as they are now made, it is frequently difficult, in varying the distance between the crushing-rollers, to adjust them so that the space between is equal in width throughout, one end of the adjustable roller often coming closer to the other roller than the other end, which, of course, is very objectionable. My invention tends to meet this objection by insuring equal motion in both bearings of the adjustable roller as long as the rollers are properly parallel, and independent motion in one end to bring them parallel.

A in the drawing is the frame of the crushing-machine. B and C are the crushing-rollers, of suitable or ordinary construction. The roller C is hung in bearings $a$ and $b$, which can slide on the frame A, so that such roller may be moved nearer to or farther away from the roller B, to vary the degree of crushing in the requisite manner. Each of the bearings $a\ b$ has a projecting socket, $d$, in which one end of a screw, $e$, is secured by means of a pin, $f$, or otherwise. The two screws $e\ e$ project at right angles from the roller C, and are both embraced by worm-wheels $g\ g$, having internal screw-threads that match the threads of the screws $e$. The wheels $g\ g$ are confined in stationary boxes $h\ h$, so that they are not capable of longitudinal displacement. Their teeth mesh into threaded portions $i\ i$ of a shaft, D, which has its bearings in the frame A, as shown.

Whenever the shaft D is turned its threaded parts $i\ i$ will cause the wheels $g\ g$ to turn, both wheels turning in equal ratio and direction. The two wheels, by the screw-threads on their inner edges, take hold of the threads of the screws $e\ e$, and draw said screws lengthwise in the desired direction, and with them the boxes $a\ b$ and the roller C. In this manner both ends of the roller C will be moved at the same time, in the same direction, and the same distance. But when one end of the roller C is to be adjusted the fastening $f$ at that end is loosened, and the squared end of the corresponding screw taken hold of by a wrench and turned until the roller C is again parallel with B.

I claim as my invention—

1. The wheel $g$, having its external circumference toothed to engage into the worm $i$, and its inner circumference threaded to embrace the screw $e$, and confined within a box, $h$, so that it cannot be longitudinally displaced while moving the screw $e$ lengthwise, and the roller C connected thereto, substantially as specified.

2. The combination of the sliding boxes $a\ b$ and roller C with the projecting screws $e\ e$, internally-threaded worm-wheels $g\ g$, boxes $h\ h$, and worms $i\ i$ on shaft D, all combined to operate substantially as specified.

ANTON DOBLER.

Witnesses:
F. V. BRIESEN,
E. C. WEBB.